(12) United States Patent
Hsu et al.

(10) Patent No.: US 7,733,964 B2
(45) Date of Patent: Jun. 8, 2010

(54) AUTOMATIC ADAPTIVE EQUALIZATION METHOD FOR HIGH-SPEED SERIAL TRANSMISSION LINK

(75) Inventors: Louis L. Hsu, Fishkill, NY (US); Karl D. Selander, Hopewell Junction, NY (US); Michael A. Sorna, Hopewell Junction, NY (US); Jeremy K. Stephens, Seattle, WA (US); Huihao Xu, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 11/974,967

(22) Filed: Oct. 17, 2007

(65) Prior Publication Data

US 2008/0137721 A1 Jun. 12, 2008

Related U.S. Application Data

(63) Continuation of application No. 10/710,064, filed on Jun. 16, 2004, now Pat. No. 7,295,618.

(51) Int. Cl.
*H04B 3/00* (2006.01)
*H04L 25/00* (2006.01)

(52) U.S. Cl. ................. 375/257; 375/296; 375/220; 375/221

(58) Field of Classification Search ............... 375/257, 375/296, 220, 221, 231, 232, 233
See application file for complete search history.

(56) References Cited

U.S. PATENT DOCUMENTS 7,295,618 B2 * 11/2007 Hsu et al. ................... 375/257
2004/0258166 A1 * 12/2004 Camara et al. .............. 375/257

* cited by examiner

*Primary Examiner*—Phuong Phu
(74) *Attorney, Agent, or Firm*—Joseph P. Abate; Daryl K. Neff

(57) ABSTRACT

In a method for performing equalization of a communication system, a predetermined signal can be transmitted from a transmitter unit to a receiver unit in a downchannel direction on a transmission line, for example as a pair of differential signals which simultaneously transition in opposite directions on respective signal conductors of the transmission line. At the receiver unit, an eye opening of the signal received from the transmission line can be analyzed to determine equalization information. Equalization information can be transmitted from the receiver unit to the transmitter unit in an upchannel direction on the transmission line and be received at the transmitter unit. Using received equalization information, a transmission characteristic of the transmitter unit can be adjusted.

5 Claims, 9 Drawing Sheets

AUTOMATIC ADAPTIVE EQUALIZATION METHOD FOR HIGH-SPEED SERIAL TRANSMISSION LINK

CROSS-REFERENCE TO RELATED APPLICATION

This application is a continuation of U.S. application Ser. No. 10/710,064 filed Jun. 16, 2004, now U.S. Pat. No. 7,295,618 the disclosure of which is incorporated by reference herein.

BACKGROUND OF THE INVENTION

The present invention relates to data communications.

In high-speed serial links of data communications networks, losses in signal integrity occur as a data signal is communicated over a non-ideal channel such as a coaxial cable or a backplane between transmitter and receiver cards at respective ends of a link. As the data signal propagates through a non-ideal channel, it experiences losses due to non-ideal transmission line effects, as well as lumped parasitic elements that exist in the vias, connectors, package, etc. that occur along the channel and which effectively attenuate high frequency components, and thus, distort the signal. One result of the distortion is an increase in jitter. An effect of jitter is a decrease in the width of the eye opening of the data signal received by a receiver. A narrower eye opening makes individual data bits carried by the data signal less likely to be received correctly, while a wider eye opening makes the bits more likely to be received correctly. Thus, the eye opening of the received signal is highly correlated with bit error rate. Therefore, the eye opening is a figure of merit for the quality of the channel and the transmitter and receiver which communicate over the channel.

One of the challenges of a data communications system is to provide a system and method of automatically performing adaptive equalization capable of use with transmission channels having different coupling modes and nominal transmission frequencies. Another challenge is to provide automatic adaptive equalization to counteract losses at higher frequencies, which are not known a priori, for example, when losses are due to the particular installation of the transmitter, receiver, and transmission channel between them.

In non-ideal transmission channels, the amplitude of a signal near the upper frequency limit of any of the transmitter, receiver, and transmission line is attenuated. The frequency characteristic tends to be spread over a broad range of frequencies, causing signal integrity to be degraded. This is felt particularly by integrated circuit chips and core elements of chips which have a serializer-deserializer (SerDes) function, i.e. chips and subsystems of chips (collectively, "SerDes chips") which perform high switching speed serial data transmission, reception or both. SerDes chips are typically interconnected via a backplane, one or more cables, or both backplane and cables. A goal of designing SerDes chips is to counteract attenuation at higher frequencies, and accordingly improve the integrity of signals transmitted over a non-ideal transmission channel.

Referring to FIG. 1, a conventional data transmitter is illustrated, in which parallel input data DIN0, DIN1, DIN2 and DIN3 are first serialized by a serializer 10, then passed to a N tap FFE 11. The output of the transmitter, serialized high-speed differential data signals TXDP and TXDN are terminated differentially with 100 Ohm impedance by a transmitter resistor termination circuit 13 to avoid reflections. The purpose of the Feed Forward Equalizer (FFE) 11 is to amplify higher frequency spectral content of the data being transmitted more than the spectral content at other frequencies. Another purpose is to counteract inter-symbol-interference (ISI). The degree to which the spectral content is amplified at different frequencies is controllable by the relative magnitudes and signs of the tap coefficients of the FFE 11.

In general, an FFE 11 includes a Finite Impulse Response (FIR) filter 11a, which is followed by a driver stage 11c. In the particular example shown in FIG. 1, an optional pre-driver stage 11b is coupled between the FIR filter 11a and the driver stage 11c. Typically, a FIR filter includes a shift register including a series of taps into which a stream of data bits including preceding, current and succeeding bits is loaded serially for transmission. The output of the FIR filter is generated as a weighted sum of the stream of data bits present in the shift register at any given point in time, the sum weighting individual data bits of the stream with tap coefficients. The weighted sum can be expressed as a transfer function between input and output of the FIR filter in the z domain having a form of typically $H(z)=S[1+(b_1)z^{-1}+(b_2)z^{-2}+(b_3)z^{-3}\ldots+(b_n)z^{-n}]$, where $b_1, b_2, b_3$ and $b_n$ are the tap coefficients (the tap coefficients normally being set by registers in the logic). S is a scaling factor and all coefficients are negative for the purpose of pre-emphasis. The determining factors of the FIR filter coefficients include the characteristics of the transmission media, transmission data rate, type of board connector and package, etc.

Specifically, the N tap FFE 11 includes an N tap FIR 11a followed by N pre-drivers 11b and/or N drivers 11c in parallel. The FFE tap coefficients b0, b1, b2, and bn are biasing currents of the driver stage which are determined by control signals T0, T1, T2, and Tm, as presented to a digital to analog converter (DAC) 12. These control signals T0, T1, T2, and Tm are generated elsewhere by logic and provided to the DAC 12 through registers. In general, customers set the control signals T0, T1, T2, and Tm for the FFE tap coefficients to vendor-recommended values through such registers according to the needs of their particular application.

A conventional data receiver for receiving signals such as the type transmitted by the transmitter 100 is illustrated in FIG. 2. As illustrated, serialized high-speed differential data signals RXDP and RXDN, arriving from a transmission channel (not shown), are terminated differentially with 100 Ohm impedance by a receiver resistor termination circuit 23 to reduce reflections. A receiver common mode voltage bias circuit 24 is used to allow optimal data receiver common mode voltage selection for different operation modes (AC-coupled mode or DC-coupled mode). Serialized data RXDP and RXDN are received at the data receiver front circuitry 20 and then deserialized back to parallel format by the de-serializer 21. In general, a signal detect circuit 22 is required as part of the data receiver to have the capability of detecting whether there is a valid incoming data at front of the data receiver.

In practice, as an initial step to placing SerDes chips in use, several different lengths of cable and/or interconnects of a backplane are characterized to determine optimal FFE settings for the data transmitter 100 that result in minimum jitter. Customers are then given information for setting the tap coefficients of the FFE. Settings for the tap coefficients can then be entered through a register interface.

When a SerDes chip is operated, the transmitted data eye of the output at a given point within the system can be optimized by manually manipulating the control settings including the tap coefficient settings, and observing the results on an oscilloscope. The control settings are then applied to all of the SerDes units used in the same way, i.e. all SerDes units installed for use in a particular application to operate at a particular speed, having particular transmission parameters, etc.

The above-described techniques for determining appropriate control settings generally involve an "equalization" function that can be described as "preset" equalization, the equalization being a degree to which particular frequencies of the transmission signal are emphasized. Preset equalization requires settings to be determined separately for each particular application in which the SerDes units are installed. For that reason, preset equalization is considered to be an inflexible approach to determining control settings. However, preset equalization may result in the settings for some SerDes units being incorrectly set, leading to problems. If less than enough equalization is applied, compensation for high frequency loss will not be very effective. On the other hand, if too much equalization is applied, excessive power is consumed, and excessive cross-talk noise could be generated and presented to links which carry signals from neighboring SerDes units.

There are various existing equalization circuits such as FFE (Feed Forward Equalizer) discussed above, DFE (Decision Feedback Equalizer), and other built-in pre-distortion circuits to compensate high frequency attenuation due to non-ideal transmission channels. However, they are either data transmitter based or data receiver based. In other words, no feedback or any communication is established between data transmitter and data receiver. None of them is able to fully analyze the transmission channel characteristics and then accordingly calibrate the equalization parameters. None of them can optimally compensate high frequency loss due to the transmission channel.

U.S. Pat. No. 6,563,863 (the '863 patent") describes an echo cancellation scheme used in a modem of a computer having a central processing unit (CPU). The computer modem has a transceiver interface, which includes a digital-to-analog converter (data transmitter) and an analog-to-digital converter (data receiver) for converting samples to/from analog signals for transmission on a telephone line (transmission channel). Two conventional adaptive FIR (Finite Impulse Response) filters are used. The first filter is used to adapt in response to an echo correlation between data transmitted over a transmit channel of the modem and data received on a receive channel of the transceiver interface during normal operation. The second filter, referred to in the '863 patent as an echo canceller, adapts in response to the echo estimated by the first filter during period in which the first filter is "starved" of data. The echo canceller is then used to subtract the adapted echo from the received signal to obtain only the far modem signal during normal operation. A closed loop feedback path is established between the transmitter and receiver to adaptively adjust two FIR filters in response to the changing echo characteristics of transmission path. However, in the '863 patent, the closed loop feedback path is through the interface to the CPU, instead of through a transceiver interface.

SUMMARY OF THE INVENTION

According to aspects of the invention described herein, an automated adaptive equalization method and system are provided for serial data communications, especially for high-speed serial data communications.

According to an aspect of the invention, a data communication system includes a transmitter unit and a receiver unit. The transmission unit has a transmission characteristic that is adjustable in accordance with equalization information. The transmission unit is operable to transmit a predetermined signal and the receiver unit is operable to receive the predetermined signal. The receiver unit is further operable to generate the equalization information by examining the eye opening of the received signal, and to transmit the equalization information to the transmitter unit.

According to another aspect of the invention, a method of performing equalization of a communication system includes transmitting a predetermined signal from a transmitter unit; receiving the predetermined signal by the receiver unit; analyzing an eye opening of the received signal to determine equalization information; and adjusting a transmission characteristic of the transmitter unit using the equalization information.

According to yet another aspect of the invention, a data receiver unit is operable to receive a predetermined signal, to generate equalization information by examining the eye opening of the received predetermined signal, and to transmit the equalization information to a transmitter unit that transmits the predetermined signal.

A method according to a preferred aspect of the invention includes automatic adaptive equalization for use in real time under any SerDes application environment. According to such method, the characteristics of transmission channels are learned through the transmission and reception of pseudo-random data patterns. When the transmission channel characteristics have been learned, the FFE tap coefficients of the SerDes transmitter are accordingly adaptively adjusted to equalize losses near the upper end of the signal frequency spectrum due to the non-ideal transmission channel.

An automated adaptive equalization system for a high-speed serial data link is provided according to preferred aspects of the invention. In such system embodiment of the invention, a common data transmitter (TX) is provided with an up channel receiver (UpchRx) and up channel receiver logic (UpchRxLogic) residing at the data transmitter side, and up channel transmitter (UpchTx) and up channel transmitter logic (UpchTxLogic) residing at the data receiver side. The Up channel transmitter logic analyzes the received data eye opening and calculates FFE tap coefficients (up channel data) for better high frequency loss compensation. The Up channel transmitter receives encoded up channel data from the up channel transmitter logic and transmits data upstream through the channel. The Up channel receiver receives up channel data from the channel and delivers the data to the up channel receiver logic. The Up channel receiver logic decodes the received up channel data from the up channel receiver and accordingly updates FFE tap coefficients.

According to still other preferred aspects of the invention, an automated method is provided to evaluate channel characteristics by analyzing the eye opening of a received data signal on the data receiver side and then adaptively equalizing the channel through adjustment of FFE tap coefficients of the data transmitter to counteract high frequency loss.

According to another preferred aspect of the invention, automated adaptive equalization is performed as follows. A data transmitter transmits a pseudo-random data pattern downstream to data receiver for a period of time. The data transmitter then stops transmitting and enters a high impedance (high-Z) state. The data transmitter is disabled in such state by turning off bias current used to operate the driver stage of the transmitter. While the data transmitter is transmitting the pseudo-random data pattern, the data receiver receives the data pattern and de-serializes it back to a parallel format. Up channel transmitter logic at the receiver is then used to statistically analyze the eye opening of the received data signal. By analyzing the received signal eye opening, the transmission channel characteristics are evaluated and learned.

In one preferred aspect of the invention, control information is determined for setting or adjusting the tap coefficients of the FFE to improve the signal eye opening, based on measurement of the received signal eye opening. The control information is transmitted in an up channel direction up the data transmission channel from the up channel transmitter at data receiver side to the up channel receiver at the data transmitter side.

According to still other preferred aspects of the invention, at the data transmitter side of the data transmission channel, the up channel receiver receives the transmitted control information and the up channel receiver logic decodes the control information. The FFE tap coefficients are updated in accordance therewith, and thereafter, the data transmitter is re-activated to transmit the pseudo-random data pattern again in a downstream direction of the data transmission channel to the data receiver. The above-described process of receiving the data pattern, measuring the signal eye opening, and determining updated control information for transmission in the up channel direction back to the up channel receiver then begins again. This iterative adaptive equalization process continues until the optimum data eye opening is achieved, i.e. until the data eye opening betters a predetermined criterion, and/or until no further significant improvement is achieved by the iteration.

According to still other preferred aspects of the invention, the ability to connect the up channel receiver to the outputs of the data transmitter within a single chip make the up channel receiver available for monitoring operation of the data transmitter. In such way, the up channel receiver can be utilized as a receiver for receiving test signals outputted by the data transmitter during production verification testing of chips (during either pre-packaging testing at the wafer level, testing at the module level during or after packaging, or both), for analog and logic testing of the data transmitter. The output of the up channel receiver is then transferred as a logic level signal to a scan interface of the chip for output to external test apparatus. The up channel receiver is a light receiver, residing at the very output end of the data transmitter, the up channel receiver having small area and adding negligible parasitic load to the critical high-speed serialized data path.

Similarly, according to such preferred aspects of the invention, the ability to connect the up channel transmitter to inputs at the front end of the data receiver within the same chip make it available for transmitting test signals (such as provided thereto from a scan interface of the chip) to the data receiver on the same chip. In such way, the up channel transmitter can be utilized as a low frequency transmitter for testing operation of the data receiver during production verification testing of chips at the wafer level and at the module level, as described above for the up channel receiver. The output of the data receiver is then transferred typically as a logic level signal and/or as an analog signal to a scan interface of the chip for output to external test apparatus. Similar to the up channel receiver, the up channel transmitter is a light receiver, having small area and adding negligible parasitic load to the critical high-speed serialized data path.

Thus, according to this aspect of the invention, the up channel receiver of the SerDes data transmitter and the up channel transmitter of the SerDes receiver facilitate more extensive analog and logic testing of SerDes chips, both at the wafer level and at the module level. Among the testing improved thereby are, for example, the LSSD (logic level scan design) test at the wafer level, DC Macro test at the module level, boundary testing per JTAG (Joint Test Action Group) specification, and on-speed testing of SerDes operation through transmission of a pseudo-random bit sequence (PRBS), for example. With such testing, failing chips can be identified earlier in the process, such as at the wafer level prior to packaging, thereby reducing packaging expense as well as total test time required to identify such failing chips. With better testing at the wafer level, improvements in the production yields of the packaged chips are made possible.

DETAILED DESCRIPTION

Figure 1:
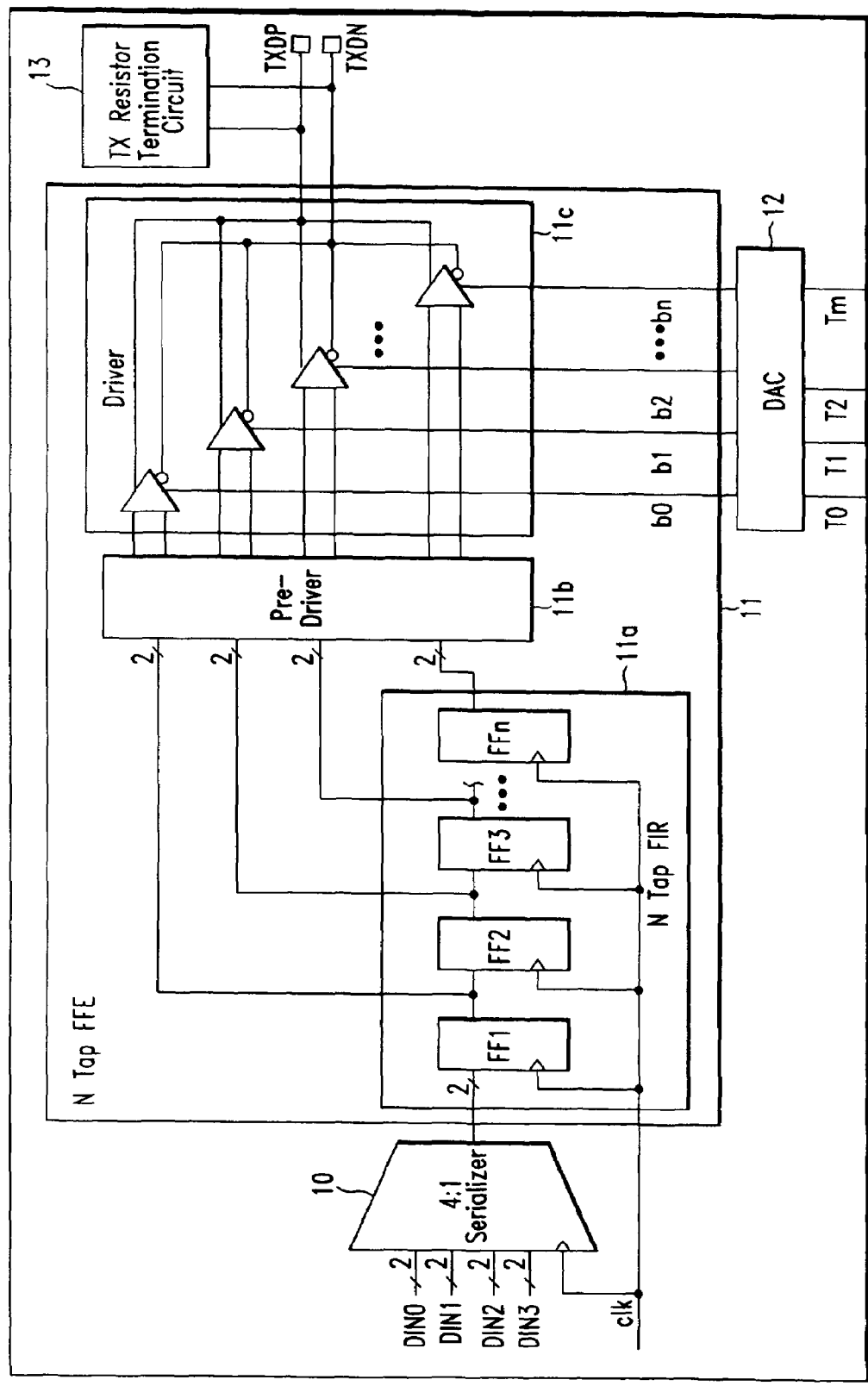
FIG. 1 is a diagram illustrating a conventional high speed serial data transmitter having a built-in feed forward equalizer (FFE).
Figure 2:
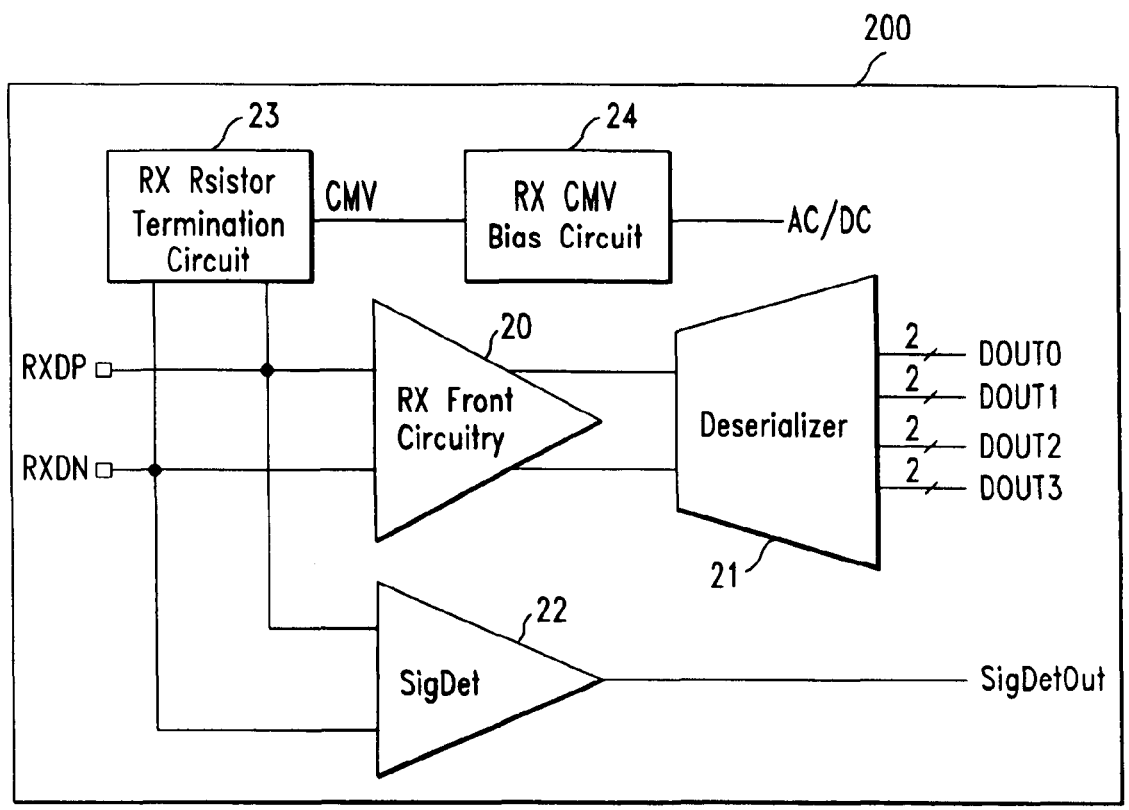
FIG. 2 is a block diagram illustrating a conventional high-speed serial data receiver.
Figure 3:
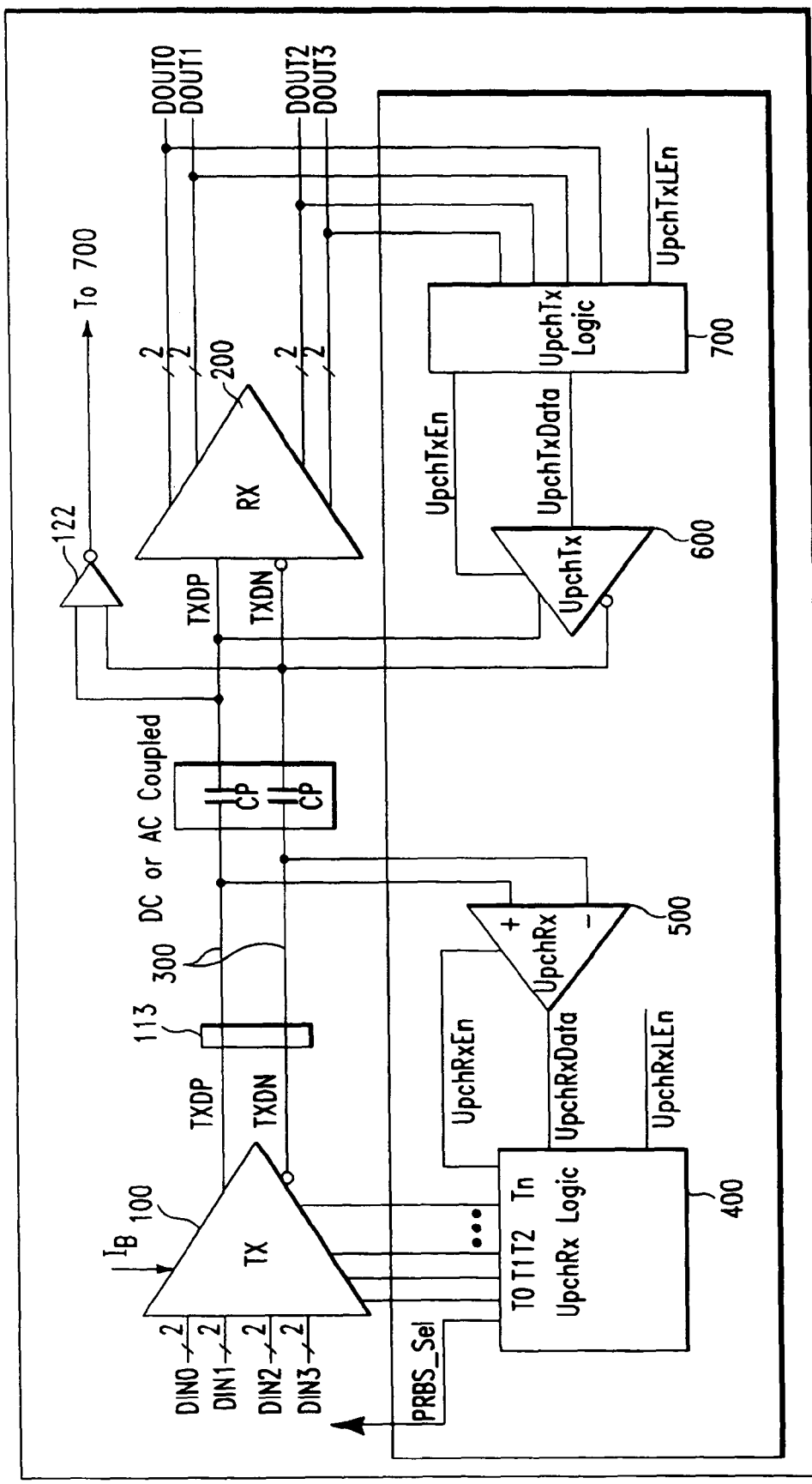
FIG. 3 is a diagram of a high-speed serial data transmission system including a data transmitter and a data receiver, according to embodiments of the present invention, the system being operable to perform automated adaptive equalization.

FIG. 3 is a block diagram illustrating a high-speed serial data transmission system 900 in accordance with an embodiment of the present invention. The system shown on FIG. 3 is called an automated adaptive equalization system. Such system includes a common data transmitter 100 and a common data receiver 200. Parallel input data DIN0, DIN1, DIN2, and DIN3 are supplied to the data transmitter 100, which serializes and outputs the data serially as high-speed differential data signals TXDP and TXDN. These signals are transmitted downstream to the data receiver 200 through a non-ideal transmission channel 300. The differential data signals RXDP and RXDN represent these signals, as modified by passage through the transmission channel 300. The data receiver 200 receives serialized high-speed differential data signals RXDP and RXDN from the transmission channel 300 and deserializes the received data therefrom back to a parallel format as data signals DOUT0, DOUT1, DOUT2, and DOUT3. The transmission channel 300 can be either DC-coupled or AC-coupled. When the transmission channel 300 is AC-coupled, a pair of large off-chip DC-blocking capacitors CP and CN are inserted in the path of the differential signals TXDP and TXDN through the transmission channel 300.

The data transmission system further includes an up channel transmitter 600 and up channel transmitter logic 700 provided at the data receiver side, and an up channel receiver 500 and up channel receiver logic 400 provided at the data transmitter side. When DC-coupled, no DC-blocking capacitors are inserted in the path of the signals through the transmission channel 300. With the addition of the up channel circuitry 700, 600, 500 and 400, the transmission channel 300 is utilized in an upstream direction, opposite the downstream direction in which high-speed serialized data signals are transmitted, such that information for performing equalization are transmitted from the data receiver 200 to the data transmitter 100 via the same transmission channel 300. In such manner, a feedback loop enabling adaptive equalization is effectively established among the data transmitter 100, transmission channel 300, and the data receiver 200. Tap coefficients of the FFE of the data transmitter 100 are adaptively optimized thereby to compensate high frequency loss due to non-ideal transmission channel 300. The purpose of the up channel enabled data receiver 200 is to characterize the transmission channel by analyzing the received data eye opening, and calculate a new set of FFE tap coefficients for better data eye opening. The up channel transmitter 600 is then used to transmit information for setting the FFE tap coefficients upstream along the transmission channel 300 from the data receiver side to the data transmitter side.

Automated adaptive equalization process is achieved through the cooperative interaction among the data transmitter 100, the data receiver 200, up channel transmitter circuitry (up channel transmitter 600 and up channel transmitter logic 700) and up channel receiver circuitry (up channel receiver 500 and up channel receiver logic 400). Automated adaptive equalization is accomplished by having the data transmitter 100 repetitively transmit the following equalization data pattern: pseudo random data—high z (high impedance) mode—pseudo random data—high z mode . . . —pseudo random data—high z mode. The time gap for transmitting pseudo random data is chosen to be long enough for accumulating enough data samples at the data receiver 200 for meaningful and representative analysis on data eye opening. The time gap for being in high z mode is also chosen to be long enough for completing up channel data transmission and reception (one set of N tap FFE coefficients) between the up channel transmitter 600 at data receiver side and the up channel receiver 500 at data transmitter side.

During the transmission of pseudo random data, the data transmitter 100 is in normal operating mode transmitting built-in pseudo random data, such as a pseudo random bit stream (PRBS). During such transmission, the data receiver 200 receives serialized high-speed data from the signals RXDP and RXDN, then de-serializes the data back to the parallel data signals DOUT0, DOUT1, DOUT2, and DOUT3. The up channel transmitter logic 700 receives the de-serialized data DOUT0, DOUT1, DOUT2 and DOUT3 and statistically analyzes the received data eye opening, then calculates a new set of FFE tap coefficients for further adjustment on counteracting high frequency loss due to transmission channel.

Figure 6:
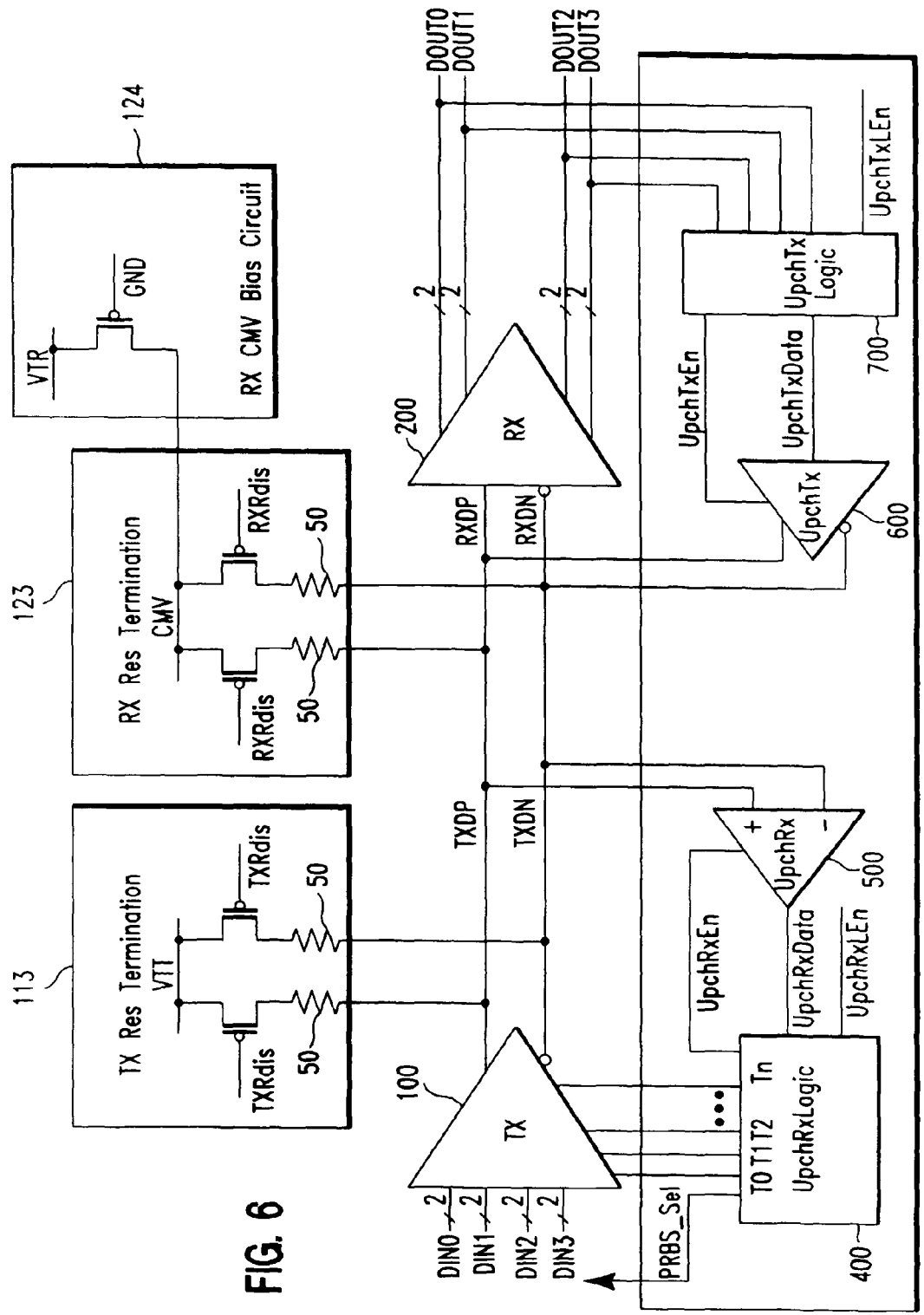
FIG. 6 is a diagram illustrating up channel operation in DC-coupled mode.

As soon as the data transmitter 100 completes transmission of pseudo random data, the data transmitter 100 is forced to high z mode by the up channel receiver logic 400. The data transmitter 100 is disabled by turning off a bias current $I_B$ to the driver stage. At such time, the data transmitter outputs TXDP and TXDN are both pulled up to VTT by a resistor termination circuit 113 (FIG. 6). The signal detect circuit 122 at the data receiver front end senses a stream of zero differential incoming data, and flags it as no valid incoming data (SigDetOut=Low). This condition, SigDetOut=Low, signals up channel transmitter logic 700 to enable up channel transmitter 600 (UpchTxEn=High) to start sending up channel packets (FFE tap coefficients) to the up channel receiver 500. The up channel transmitter 600 then sends out up channel packets upstream accordingly. Because the data transmitter 100 is disabled during high z mode, up channel data arrives at the data transmitter end of the transmission channel 300 without collision. The up channel receiver 500 receives the collision-free up channel data and delivers it to the up channel receiver logic 400. Up channel receiver logic 400 decodes the up channel data and updates the data transmitter FFE tap coefficients in accordance therewith.

Upon the completion of transmitting up channel data, at the data receiver 200, up channel transmitter 600 is disabled and waits for next activation signal from up channel transmitter logic 700. Similarly, at the data transmitter 100, upon the completion of updating FFE tap coefficients, the data transmitter 100 is reactivated to transmit pseudo random data. The data receiver 200 receives serialized high-speed data RXDP and RXDN and de-serializes the serialized high-speed data to parallel format, and up channel transmitter logic accumulates the received data and analyzes the data eye opening again. This iterative equalization process will continue until an optimal data eye opening is achieved. According to the present invention, this iterative equalization process is called an automated adaptive equalization.

The automated adaptive equalization can be initiated anytime by customer through registers (UpchTxLEn=High and UpchRxLEn=High). At the completion of the automated adaptive equalization, the data transmitter FFE is optimized with a set of new FFE tap coefficients to most effectively counteract high frequency attenuation due to non-ideal transmission channels. However, during the equalization process, no real data transmission is allowed. Thus, in general, this equalization process takes place upon the data transmission system 900 being powered up, or after installation of new line cards, or under other circumstances in which re-optimization of FFE tap coefficients is necessary.

Optimizing the data eye opening via adjusting FFE tap coefficients to counteract high frequency loss due to transmission channel, according to the present invention, can be characterized as a fully automated equalization process. Fully automated means no human effort is required to collect and characterize representative transmission channels. Further, no human effort is required to adjust different combinations of FFE tap coefficients, and human effort is eliminated for activity no longer needed to set up laboratory equipment for observing and analyzing the data eye opening, as was done previously. The customer can control the registers (UpChTxLEn=High and UpChRxLEn=High) to activate up channel adaptive equalization process any time, and then in matter of milliseconds, the transmission channel is fully analyzed and understood for the application environment to be use. In such manner, an optimal set of FFE tap coefficients are found and fully tested with pseudo random data before real data transmission.

According to an embodiment of the invention, adaptive equalization is performed in which the up channel transmitter logic in the data receiver accumulates received data and statistically assesses the quality of the data eye opening. The information is then fed back to the data transmitter on how to adjust the quality of the data eye via up channel transmitter. The equalization process is iterative and will continue adjusting FFE tap coefficients until an optimal data eye opening is achieved.

Figure 4:
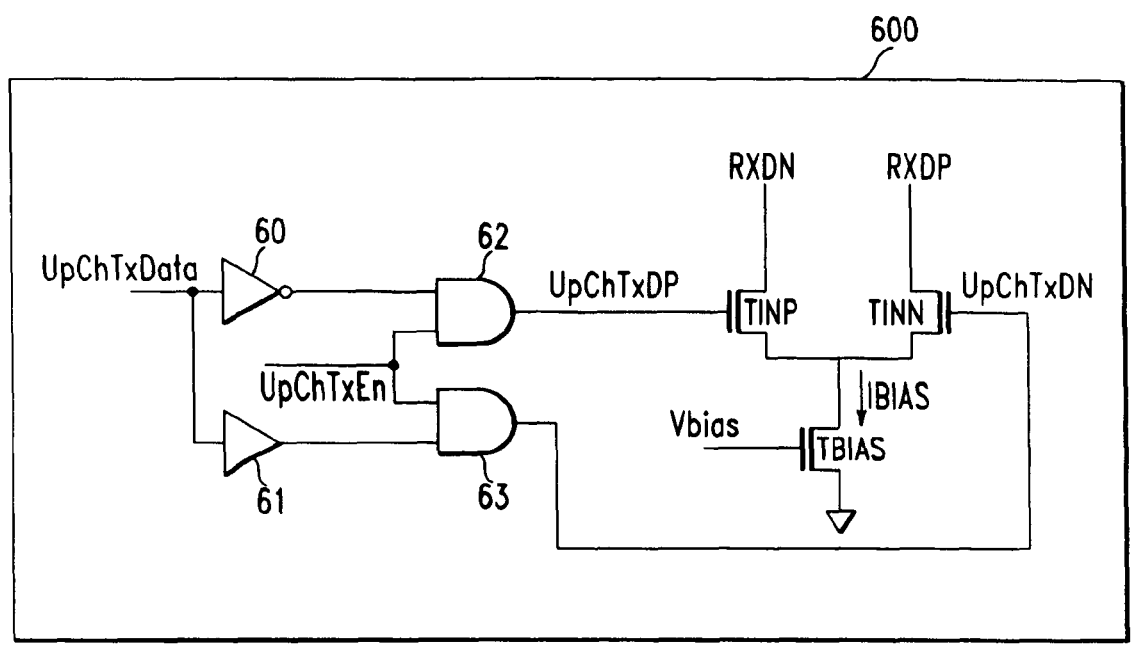
FIG. 4 is an example implementation of an up channel transmitter for use in an embodiment of the invention.

As illustrated in FIG. 4, the up channel transmitter 600 includes a common single-ended to differential converter device pair (devices 60 and 61), followed by a common differential NFET pair TINP and TINN, which are used to steer the tail biasing current Ibias on one leg or the other. UpChTx-Data is the up channel data and UpChTxEn is a logic control signal of enabling or disabling up channel transmitter based on signal detect circuit output SigDetOut. Both signals are fed by up channel transmitter logic. When UpChTxEn=Low, UpChTxDP and UpChTxDN are both low and TINP and TINN are both turned off and tail current device TBIAS is disabled by turning off the voltage bias VBIAS, thus fully disabling the up channel transmitter 600. When UpChTxEn=High, TINP and TINN switch according to up channel data UpChTxData and the tail current device TBIAS is fully on with a constant biasing current IBIAS. For example, when UpChTxEn=High and UpChTxData=High, UpChTxDP=High and UpChTxDN=Low and TBIAS is on with a constant amount of IBIAS, thus TINP is on and pulls down RXDN=Low and TINN is off and pulls up RXDP=High.

Figure 5:
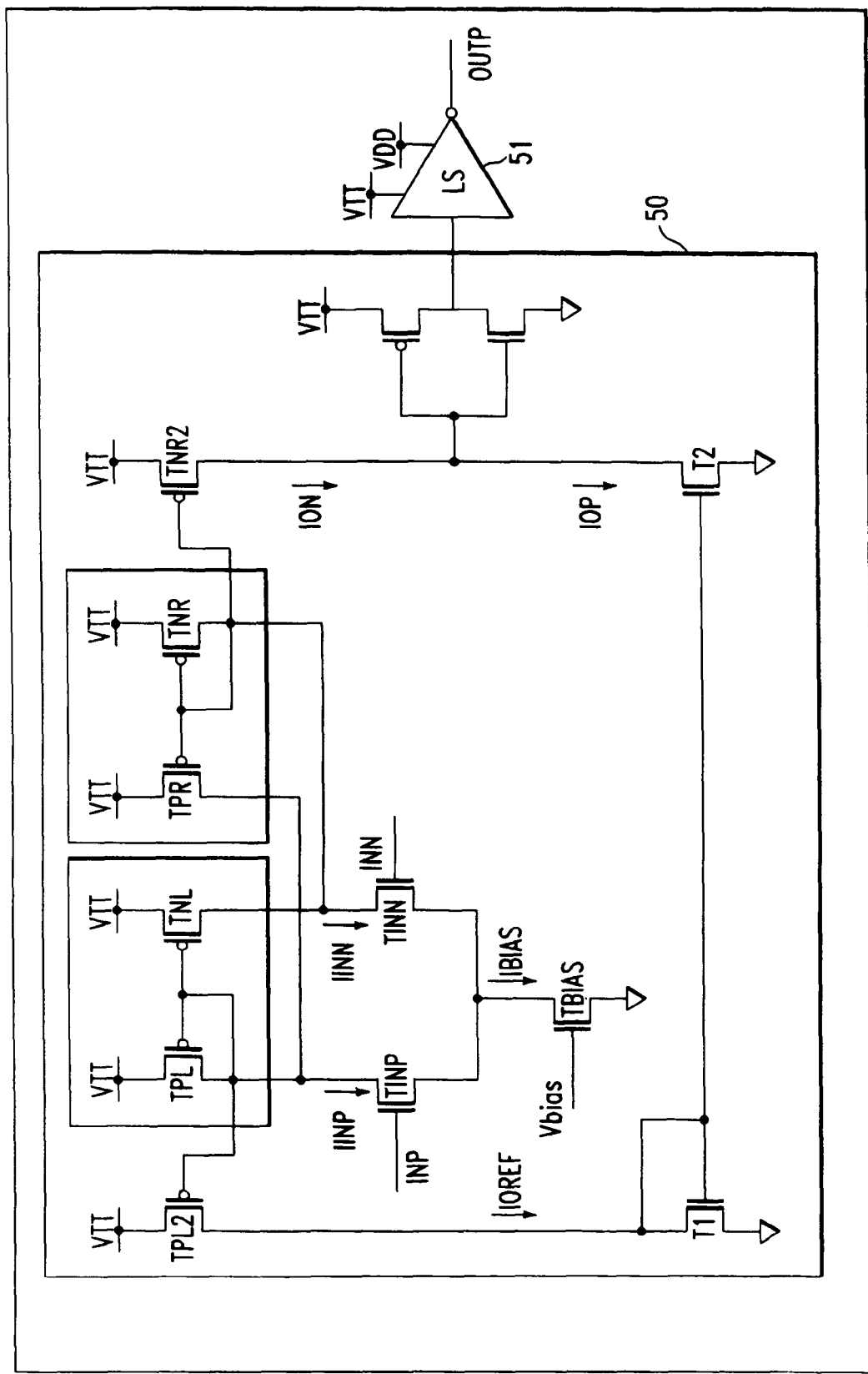
FIG. 5 is an example implementation of an up channel receiver for use in an embodiment of the invention.

As illustrated in FIG. 5, the up channel receiver 500 includes a conventional hysteresis comparator 50 followed by a common level shifter 51 to transition from analog power supply domain VTT to logic power supply domain VDD. The hysteresis comparator 50 includes of two regular comparators, one for positive trip (output transitions from low to high) and the other for negative trip (output transitions from high to low). The hysteresis comparator 50 is needed for the purpose of establishing good noise margin, so that up channel receiver is not sensitive to power supply noise. The hysteresis threshold is determined by the ratio of the active loading PFETs (TNL/TPL and TNR/TPR) as well as the biasing current Ibias. In general, the higher the ratio or the higher the biasing current, the higher the hysteresis threshold is. Amount of hysteresis threshold needed is dependent on up channel data amplitude as well as the amount of noise presented to TXDP and TXDN.

FIG. 6 illustrates the up channel operation when the data transceiver is in DC-coupled mode. DC-coupled mode means data transmitter 100 is connected to the data receiver 200 through the transmission channel without DC blocking capacitors CP and CN in between. The receiver common mode voltage bias circuit 124 delivers a resistor terminating voltage (VTR) to the receiver resistor termination circuit 123, such that the common mode voltage is set to VTR. During the adaptive equalization process, when the data transmitter 100 is transmitting pseudo random data through the channel downstream, both resistor termination circuits 113 and 123 are adjusted to 100 Ohm differentially, and the up channel transmitter 600 is disabled because signal detect circuit senses normal serialized incoming data (SigDetOut=High) and forces UpChTxEn at low. Upon the completion of transmitting pseudo random data, the data transmitter 100 is immediately forced to high z mode by the up channel receiver logic 400, both TXDP and TXDN are pulled up to VTT. Thus, zero differential serialized data is sensed by the signal detect circuit at the data receiver 200. The signal detect circuit makes the decision of no valid incoming data, thus SigDetOut turns to be Low and forces UpChTxEn to be high. UpChTxEn=High in turn enables the up channel transmitter and simultaneously disables the data receiver resistor termination circuit 123 (RXRDis=High, means RXDP and RXDN on the data receiver are terminated with infinite resistance). When up channel data comes along from the up channel transmitter logic 700, for example, UpChTxData=High (an up channel data of '1'), tail current Ibias goes through RXDN leg and no current goes through RXDP leg, thus RXDN=Low (equal to VTT-50 Ohm*Ibias) and RXDP=High (equal to VTT). Up channel receiver 500 compares TXDN to TXDP, if TXDN is less than TXDP by more than the hysteresis threshold, then up channel receiver 500 outputs a high; if TXDN is higher than TXDP by more than the hysteresis threshold, then up channel receiver 500 outputs a low. Upon the completion of last up channel data, on the data receiver side, the up channel transmitter 600 is disabled by the up channel transmitter logic 700 and at the same time the receiver resistor termination circuit 123 is enabled at 100 Ohm differentially on RXDP and RXDN. Similarly, on the data transmitter side, upon the reception of last up channel packet and completion of updating the FFE tap coefficients by the up channel receiver logic 400, the data transmitter 600 is enabled to start transmitting pseudo random data again. The adaptive equalization process continues.

Figure 7:
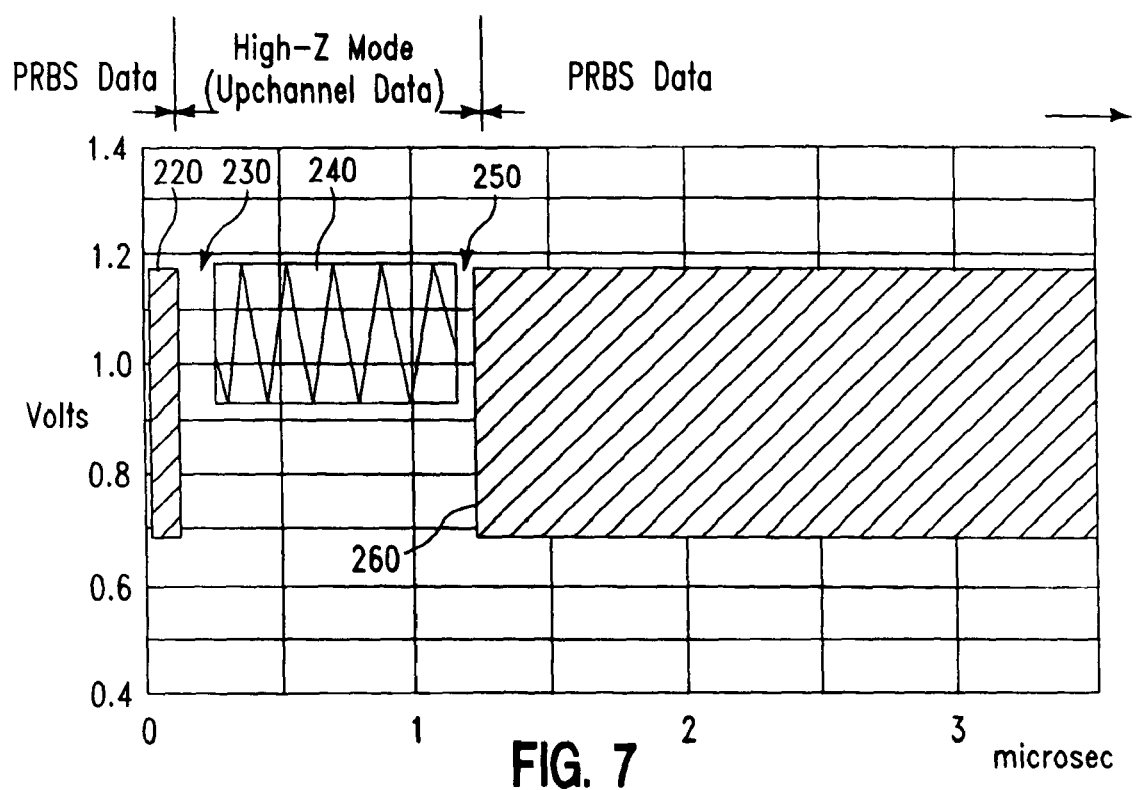
FIG. 7 is a graph illustrating representative levels of a down channel PRBS signal and an up channel data signal in DC-coupled mode.

FIG. 7 illustrates signal levels of operation in DC-coupled mode, as described above with reference to FIG. 6. Viewing the diagram from left to right, the data signals RXDP and RXDN, present at the input to the data receiver 200 during the data transmitter's transmission of the PRBS, are represented at 220. The levels of each RXDP and RXDN signal are thus individually (not peak-to-peak) 0.68 V and 1.18 V for an individual signal swing of about 0.50 V. Peak-to-peak signal swing for this differential pair is twice this swing, i.e. 1.00 V. This is followed by a gap 230 of approximately 100 nsec., at which time the data transmitter is disabled (as described above) and the up channel data receiver is prepared for transmitting. Signal levels of the UpChTXbata are represented at 240. The UpChTxData typically has a much lower frequency than the PRBS, which, by contrast, is transmitted at a speed for normal SerDes operation. The UpChTxData is transmitted for approximately 1 μsec. Illustratively, the UpChTxData has a signal swing between 0.93 and 1.18 V. Another gap 250 follows, during which time the up channel transmitter is disabled and the data transmitter is again readied for operation. The data transmitter begins transmitting the PRBS again at 260.

Figure 8:
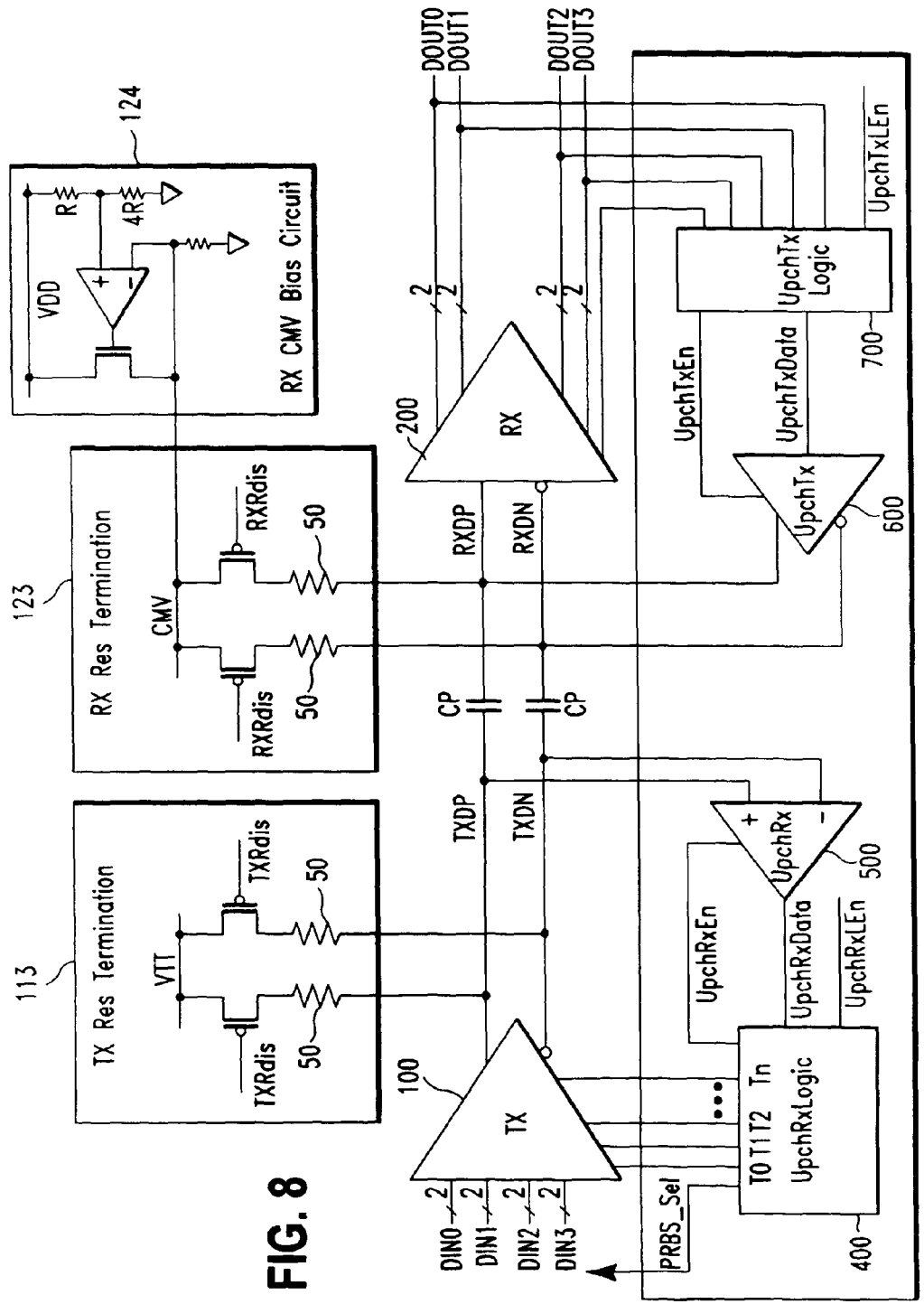
FIG. 8 is a diagram illustrating up channel operation in AC-coupled mode.

FIG. 8 illustrates the up channel operation when the data transceiver is in AC-coupled mode. AC-coupled mode means data transmitter 100 is connected to the data receiver 200 through the transmission channel with two DC blocking capacitor CP and CN in between. The common mode voltage bias circuit 124 delivers a 0.8*VDD voltage to the resistor termination circuit 123, where 0.8*VDD is pre-chosen to be the optimal common mode voltage for the data receiver 200. During the adaptive equalization process, when the data transmitter 100 is transmitting pseudo random data through the channel downstream, both resistor termination circuits 113 and 123 are adjusted to 100 Ohm differentially, and the up channel transmitter 600 is disabled because the signal detect circuit senses normal serialized incoming data (SigDetOut=High) and forces UpChTxEn at low. During the pseudo random data transmission, a long-term common mode voltage of VTT-(TXDP-TXDN) is established at the data transmitter output TXDP and TXDN. Upon the completion of transmitting pseudo random data, the data transmitter 600 is immediately forced to high z mode by the up channel receiver logic 700. Since the driver stage of the data transmitter is disabled by turning off the driver current, the data transmitter output TXDP and TXDN are pulled from the previous long-term common mode voltage of VTT-(TXDP-TXDN) to VTT. Due to big DC blocking capacitors CP and CN, this common mode voltage increment of (TXDP-TXDN) at the data transmitter 100 is transparently transferred onto the data receiver 200, thus RXDP and RXDN both jump from the previous long-term common mode voltage of 0.8*VDD to 0.8*VDD+(RXDP-RXDN).

As soon as the data transmitter 100 is forced into the high z mode, TXDP and TXDN are pulled up to VTT, and a zero differential serialized data is sent through channel and sensed by the signal detect circuit at the data receiver 200. The signal detect circuit makes the decision of no valid incoming data, flags SigDetOut at Low and changes UpChTxEn to high. UpChTxEn=High enables the up channel transmitter 600 and disables the resistor termination circuit 123 at the data receiver (RXRDis=High, means RXDP and RXDN are terminated with infinite resistance). Then, up channel data comes along from the up channel transmitter logic 700, for example, UpChTxData=High (an up channel data of '1'), the tail current Ibias goes through RXDN leg in full amount and no current goes through RXDP leg, thus RXDN=Low (equal to VTT-50 Ohm*Ibias) and RXDP=High (equal to VTT). The up channel receiver 500 compares TXDN to TXDP. If TXDN is less than TXDP by more than the hysteresis threshold, then up channel receiver 500 outputs a logic high; if TXDN is higher than TXDP by more than the hysteresis threshold, then up channel receiver 500 outputs a logic low.

At the very beginning of up channel data transmission in AC-coupled mode, DC blocking capacitors CP and CN are fully charged at 0.8*VDD+(TXDP-TXDN) on RXDP and RXDN at the data receiver 200. While there is up channel data transmitting upstream from the data receiver 200 to the data transmitter 100, DC current Ibias out of the up channel transmitter 600 flows through the DC blocking capacitors, thus DC blocking capacitors start discharging through the tail current source, consequently RXDP and RXDN start shifting lower in voltage as more and more up channel data is transmitted. As we know, when a previously fully charged capacitor starts discharging, $\Delta t=C*\Delta V cap/Icap$, which means the bigger the capacitor and/or the smaller the tail current Ibias, the longer and slower the capacitor will discharge. With a big DC blocking capacitor in orders of nF and relatively small discharging current Ibias in several mA, RXDP and RXDN discharge very slowly and their common mode voltage also decreases very slowly. Therefore, a constant DC tail current Ibias is maintained as long as the tail current source is kept in saturation. For example, with DC blocking capacitors of CP=CN=10 nF and a tail bias current Ibias of 5 mA, a common mode voltage jump of 300 mV at the data transmitter 100 can be easily transferred to the data receiver 200. A drain to source voltage (VDS) at the tail current source device TBIAS (FIG. 5) is enough to maintain that device in saturation to assure a constant current source.

Thus, $\Delta t=C*\Delta V cap/Icap=10$ nF*[0.8*VDD+300 mV-300 mV]/5 mA=1.6 μsec at VDD=1.0V. This amount of time (1.6 μsec) is long enough for completing transmission of one set of FFE tap coefficients. Moreover, because RXDP and RXDN discharge at same rate, their differential voltage RXDP-RXDN is maintained, thus the differential voltage TXDP-TXDN on the data transmitter side is also maintained. Up channel receiver 500 at the data transmitter 100 compares TXDN to TXDP. If TXDN is less than TXDP by more than the hysteresis threshold, then the up channel receiver 500 outputs a high. If TXDN is higher than TXDP by more than the hysteresis threshold, then the up channel receiver 400 outputs a low.

At the completion of up channel data transmission in AC-coupled mode, the up channel transmitter 100 is disabled by the up channel transmitter logic 400 (UpChTxEn=Low) on the data receiver 200. Similarly, at the data transmitter 100, as soon as the up channel receiver logic 400 finishes updating FFE tap coefficients, it disables the up channel receiver 500 and enables the data transmitter 100 to start transmitting pseudo random data again. At the moment of re-starting transmitting pseudo random data, the data transmitter 100 outputs TXDP and TXDN quickly drop the common mode voltage from VTT to VTT-(TXDP-TXDN). This net drop of (TXDP-TXDN) is transparently transferred onto the data receiver input RXDP and RXDN. Thus, RXDP and RXDN start at a much lower common mode voltage than normal of 0.8*VDD and must wait for a period of time to recover back to 0.8*VDD for the data receiver 200 to correctly sampling incoming high-speed differential data. Since the DC blocking capacitors are in nF, a small series resistor is required to obtain a small time constant to speed up the common mode voltage recovery. Therefore, as soon as the up channel transmitter 600 completes transmitting the last up channel data, the resistor termination circuit 123 on the data receiver 200 is immediately enabled at 100 Ohm differentially. By doing so, the DC blocking capacitors will discharge through the 50 Ohm termination resistors in series with the equivalent impedance of the common mode voltage bias circuit 124. Therefore, it is essential to design the common mode voltage bias circuit 124 to be low impedance. Moreover, that circuit 124 should be designed to actively help speed up the recovery. One simple implementation is to use a voltage regulator to actively regulate the common mode voltage at 0.8*VDD all the time. Once the data receiver common mode voltage is recovered to be in reasonable operation range, the data receiver 200 then starts to sample the incoming differential high-speed data normally. The equalization process then continues.

Figure 9:
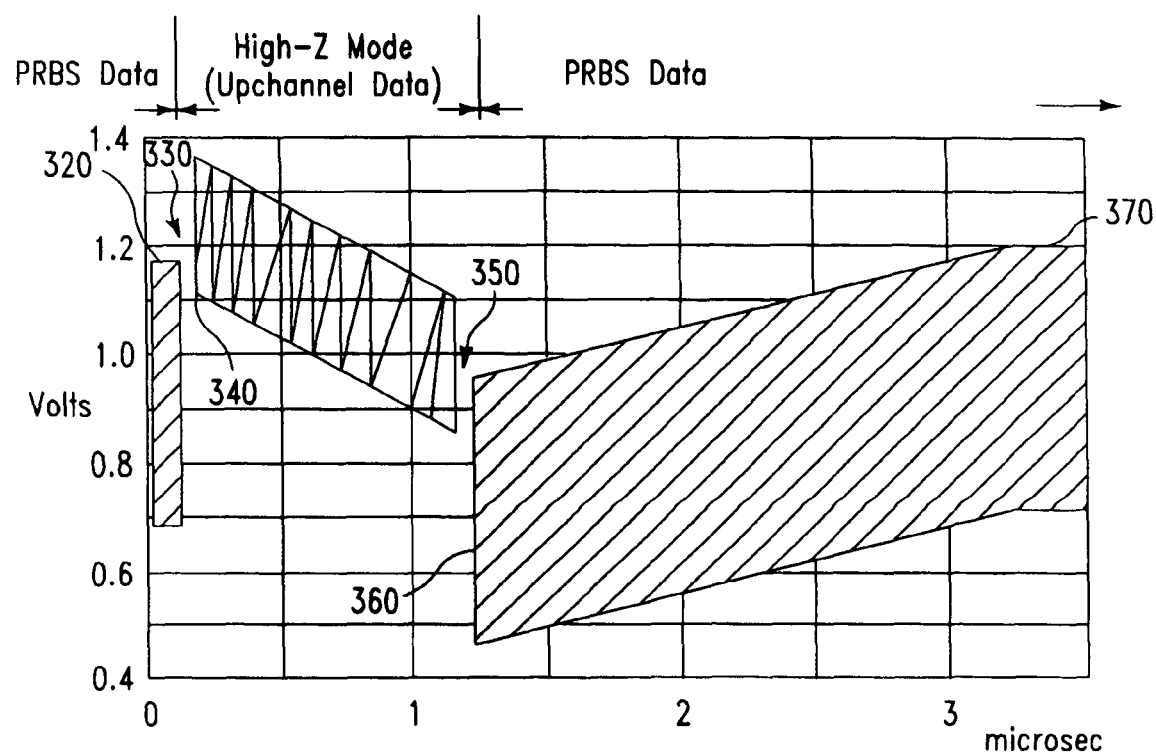
FIG. 9 is a graph illustrating representative levels of a down channel PRBS signal and an up channel data signal in AC-coupled mode.

FIG. 9 illustrates signal levels of operation in A-coupled mode, as described above with reference to FIG. 8, which DC blocking capacitors CP and CN are coupled in the path of the RXDP and RXDN signals arriving from the data transmitter, these capacitors having values typically of 10 nF. Viewing the diagram from left to right, the data signals RXDP and RXDN, present at the input to the data receiver during the data transmitter's transmission of the PRBS, are represented at 320. This is followed by a gap 330 of approximately 100 nsec., at which time the data transmitter is disabled (as described above) and the up channel data receiver is prepared for transmitting. Signal levels of UpChTXData at the beginning of transmission are represented at 340. As apparent from FIG. 9, and as described above relative to FIG. 8, in AC mode operation there is a beneficial jump in the common mode of the UpChTxData signals at the beginning of their transmission by the quantity (RXDP-RXDN), due to the charged state of the DC blocking capacitors CN and CP when UpChTXData transmission begins. However, as the voltage on the blocking capacitors decay, the levels of the UpChTxData signals decrease, illustratively ending with levels of about 0.77 V and 1.10 V. As in the DC mode example described above relative to FIG. 7, the UpChTxData is transmitted for approximately 1 μsec. Another gap 350 follows, during which time the up channel transmitter is disabled and the data transmitter is again readied for operation. The data transmitter begins transmitting the PRBS again at 360. The above-described drop in the common mode voltage of TXDP and TXDN is apparent at the start 360 of the PRBS transmission. As further apparent in FIG. 9, it typically takes about 2 μsec. (until interval 370) for the common mode voltage to recover. During this time, measurements of the eye opening of the PRBS signal received by the data receiver are preferably not taken or otherwise discarded, such measurements not being representative of true operation. At interval 370, the common mode has recovered and PRBS signal measurements can begin again.

While the invention has been described in accordance with certain preferred embodiments thereof, those skilled in the art will understand the many modifications and enhancements which can be made thereto without departing from the true scope and spirit of the invention, which is limited only by the claims appended below.

What is claimed is:

1. A method of performing equalization of a communication system, comprising:
    transmitting a predetermined signal from a transmitter unit to the receiver unit in a downchannel direction on a transmission line as a pair of differential signals which simultaneously transition in opposite directions on respective signal conductors of the transmission line;
    receiving the predetermined signal by the receiver unit from the transmission line;
    analyzing an eye opening of the received signal to determine equalization information;
    transmitting equalization information from the receiver unit to the transmitter unit in an upchannel direction on the transmission line; and
    receiving the equalization information at the transmitter unit from the transmission line and adjusting a transmission characteristic of the transmitter unit using the equalization information; and
    automatically repeating said transmitting, receiving, analyzing and adjusting until a measurement of said eye opening exceeds a predetermined criterion.

2. A method as claimed in claim 1, wherein the transmission characteristic includes pre-emphasis.

3. A method as claimed in claim 1, wherein the transmission characteristic is adjusted through a feed forward equalizer (FFE) coupled to the transmitter unit.

4. A method as claimed in claim 1, wherein the predetermined signal is transmitted on the transmission line during a first interval and the equalization information is transmitted on the transmission line during a second interval which does not overlap the first interval.

5. A method as claimed in claim 1, further comprising automatically repeating said transmitting, receiving, analyzing and adjusting until said measurement of said eye opening no longer significantly improves.

* * * * *